United States Patent
Logvin et al.

(10) Patent No.: US 7,539,373 B1
(45) Date of Patent: May 26, 2009

(54) INTEGRATED LATERAL MODE CONVERTER

(75) Inventors: Yury Logvin, Ottawa (CA); Fang Wu, Ottawa (CA); Kirill Pimenov, Ottawa (CA); Valery Tolstikhin, Ottawa (CA)

(73) Assignee: Onechip Photonics Inc., Ottawa, Ontario (CA)

( * ) Notice: Subject to any disclaimer, the term of this patent is extended or adjusted under 35 U.S.C. 154(b) by 76 days.

(21) Appl. No.: 11/984,922

(22) Filed: Nov. 26, 2007

(51) Int. Cl.
G02B 6/26 (2006.01)

(52) U.S. Cl. ............... 385/28; 385/43; 385/50

(58) Field of Classification Search .......... 385/28, 385/43, 50
See application file for complete search history.

(56) References Cited

U.S. PATENT DOCUMENTS

| | | | |
|---|---|---|---|
| 5,574,808 | A | 11/1996 | Van der Tol |
| 6,381,380 | B1 * | 4/2002 | Forrest et al. ............... 385/14 |
| 6,580,850 | B1 | 6/2003 | Kazarinov |
| 6,795,622 | B2 | 9/2004 | Forrest et al. |
| 7,218,814 | B2 | 5/2007 | Vorobeichik |
| 2007/0133648 | A1 | 6/2007 | Matsuda |

OTHER PUBLICATIONS

U.S. Appl. No. 11/882,126, V. Tolstikhin.
Swietlik et al, "Mode Dynamics of High Power (InAl)GaN Based Laser Diodes Grown on Bulk GaN Substrate" Journal of Applied Physics, vol. 101, p. 083109, 2007).
S.Blaaber et al, "Structure, Stability, and Spectra of Lateral Modes of a Broad-Area Semiconductor Laser" IEEE Journal of Quantum Electronics, vol. 43, p. 959, 2007.
J. Leuthold et al, "Multimode Interference Couplers for the Conversion and Combining of Zero-and First-Order Modes" IEEE Journal of Lightwave Tech., vol. 16, No. 7, pp. 1228-12.
Suematsu et al, "Integrated Twin-Guide AlGaAs Laser with Multiheterostructure" IEEE J. Quantum Electron., vol. 11, pp. 457-460, 1975.
J. Piprek et al, "Cavity Length Effects on Internal Loss and Quantum Efficiency of Multiquantum-Well Lasers", IEEE J. Sel. Topics Quant., vol. 5, pp. 643-647, 1999.
International Search Report of PCT/CA2007/002117 filed Nov. 26, 2007.
Vinod M. Menon et al., "Photonic Integration Using Asymmetric Twin-Waveguide (ATG) Technology: Part II-Devices", IEEE J. Sel. Topics Quant., vol. 11, Jan.-Feb. 2005; pp. 30-42.

(Continued)

*Primary Examiner*—Jerry T. Rahll
(74) *Attorney, Agent, or Firm*—Freedman and Associates

(57) ABSTRACT

The invention describes method and apparatus for a mode converter enabling an adiabatic transfer of a higher order mode into a lower order optical mode within a photonic integrated circuit exploiting integrated semiconductor ridge waveguide techniques. As disclosed by the invention, such a mode conversion is achievable by using an asymmetric coupler methodology. In an exemplary embodiment of the invention, the invention is used to provide a low insertion loss optical connection between laterally-coupled DFB laser operating in first order mode and passive waveguide operating in the zero order optical mode. The integrated arrangement fabricated by using one-step epitaxial growth allows for a launch of the laser's light into the waveguide circuitry operating in the zero order lateral mode or efficiently coupling it to single-mode fiber, an otherwise high loss interface due to the difference in laser and optical fiber modes.

25 Claims, 6 Drawing Sheets

OTHER PUBLICATIONS

K. De Mesel, et al.; "Oxide-Confined Laser Diodes with an Integrated Spot-Size Converter"; IEEE J. Sel. Topics Quant. vol. 8, pp. 1372-1380.

Y.K. Sin, et al., "Laterally Coupled InGaAsP/InP distributed feedback lasers at 1.5um for chemical sensing applications", Elec. Letters, Apr. 26, 2001 vol. 37, pp. 567-569.

J. Wang et al., "1.55-um AlGaInAs-InP Laterally Coupled Distributed Feedback Laser", IEEE Photonics Tech. Letters. vol. 17, No. 7, Jul. 2005, pp. 1372-1374.

Yi, Luo, et al., "Laterally Coupled Distributed Feedback Laser with Dry-Etched Deep Gratings", proceedings CLEO/Pacific Rim 2005, Pacific Rim Conf.; Lasers and Electro-Optics.

R.S. Balmer et al., "Vertically Tapered Epilayers for Low-Loss Waveguide-Fibre Coupling Achieved in a Single Epitaxial Growth Run", J. Lightwave Tech, vol. 21, pp. 211-217.

B. Mersali, et al.; Optical-Mode Tranformer: A III-V Circuit Integration Enabler; IEEE J of Sel. Topics in Quantum Electronics, vol. 3, No. 6, pp. 1321-1331 Dec. 1997.

F. Xia, et al., "A Monolithically Integrated Optical Heterodyne Receiver", IEEE Photonics Tech Letters, vol. 17, No. 8, Aug. 2005; pp. 1716-1718.

Xuejin Yan et al.; "Optical Mode Converter Integration with InP-InGaAsP Active and Passive Waveguides Using a Single Regrowth Process" IEEE Photonics vol. 4 pp. 1249-1251 Sep. 2002.

* cited by examiner

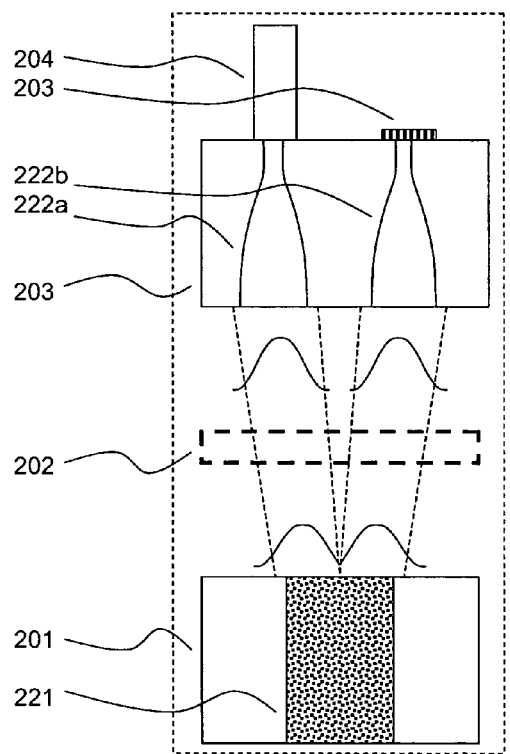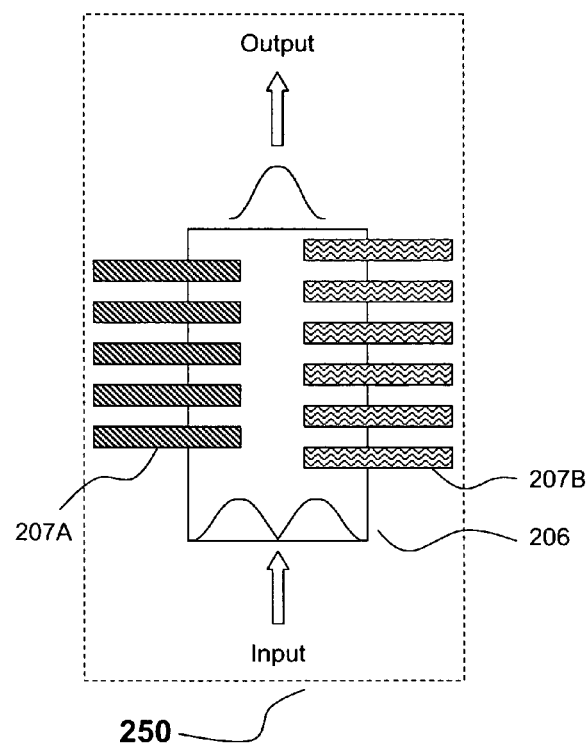
FIG. 2A
PRIOR ART
FIG. 2B
PRIOR ART

INTEGRATED LATERAL MODE CONVERTER

FIELD OF THE INVENTION

The invention relates to optical waveguides and more particularly to a photonic integrated circuit based optical field profile transformer for converting higher-order modes into a fundamental zero-order mode of the waveguide.

BACKGROUND OF THE INVENTION

Modern telecommunication technologies based on optical fibers and associated optoelectronic components are designed to deliver a variety of advanced services ranging from ultra-long distance submarine transmission, to very high capacity 10 Gbs and 40 Gb/s long-haul terrestrial backbone, through Metropolitan Area Networks (MANs) and access networks such as the "triple play" subscriber access of plain-old-telephone-service (POTS), broadband Internet, and television. The penetration of such "triple-play" service by provision of optical access networks with projected subscriber terminations requiring massive quantities of optical line terminal (OLT) equipment is strongly driven by the operators and service providers cost factors in growing and maintaining their subscriber base in a highly competitive environment. Such economic drivers including lowering overall cost-of-ownership, increased services and service delivery, and resulting in continued downward pressure on the core optoelectronic componentry. This, in turn, forces the component vendors to look for more inexpensive, smart, efficient and multi-functional approaches to providing these components and functionalities.

In this regard, semiconductor based photonic integrated circuits (PICs) in which several functions such as optical signal detection, modulation and optical signal emission are implemented in a single monolithic semiconductor chip appear to be a promising solution. Further indium phosphide (InP) and its related III-V semiconductor material system offer additional benefits as they allow the fabrication of active devices operating in the important wavelength ranges around 1300 nm and 1550 nm, i.e. in the two dominant low-loss transmission windows of the glass fibers. However, even such monolithic integration can provide cost barriers with poor design methodologies, low manufacturing yields, complicated manufacturing processes and repeated expensive epitaxial growth processes. Accordingly a single step epitaxial wafer growth methodology, in conjunction with established wafer fabrication technologies, can provide a means to further enable reduced optical components cost.

The integration not only of multiple optical functions on one chip, but multiple functions operating at multiple wavelengths, relies on a careful design and implementation of the epitaxial structure grown onto the substrate wafer and into which specific functions are implemented with specific association with a particular layer in the structure. Providing optical coupling from one layer to another, as well as controlling the spatial field profile of propagating optical signals are inevitable challenges in the PIC design. Within the prior art it is a general requirement for semiconductor lasers and other optoelectronic devices to operate in a single fundamental mode regime, which is approaching optimal from controllability point of view. Involvement of higher-order modes is commonly considered as a detrimental factor and usually special care is taken to suppress higher-order modes and to guarantee stable fundamental mode operation. However, in some circumstances operation in higher order lateral mode appears to be beneficial over fundamental mode. For example, optical couplers or other distributed feedback active or passive devices exploiting lateral grating operate more efficiently in higher order mode because higher lateral mode have better overlap with the grating. In this situation, in order to provide interface with components operating in fundamental mode (including single-mode optical fiber) lateral mode converter is necessary.

To generate high power, the optical cavities of semiconductor lasers are often required to be sufficiently wide enough that in addition to fundamental transverse mode another higher order mode comes into play. This happens in high power GaN-based lasers with wide laser ridge as demonstrated by Swietlik et al ("Mode Dynamics of High Power (InAl)GaN Based Laser Diodes Grown on Bulk GaN Substrate", Journal of Applied Physics, Vol. 101, P. 083109, 2007), and AlGaAs broad area lasers studied by S. Blaaber et al ("Structure, Stability, and Spectra of Lateral Modes of a Broad-Area Semiconductor Laser", IEEE Journal of Quantum Electronics, Vol. 43, p. 959, 2007).

Another case is laterally coupled distributed-feedback lasers where the first order lateral mode can provide a coupling efficiency superior to the fundamental zero-order mode, see for example Matsuda et al ("Optical Device Coupling Light Propagating in Optical Waveguide with Diffraction Grating", US Patent Application 2007/0133648). However, whilst efficient and stable optical generation is achieved in the first or in other higher-order mode, the challenge is then an efficient transfer of the optical signal from the spatial profile of the higher-order mode into the fundamental mode of an optical fiber or another photonic component.

Therefore, it would be highly desirable to develop a mode converter, or mode transformer, which may be easily integrated with an semiconductor laser on the same PIC whilst allowing efficient conversion of higher-order mode light signal into a field having good matching with the fundamental mode of optical fiber. In addition, it would be advantageous if the whole structure, laser and mode converter, supported preferentially the generation of the selected higher-order mode in a positive way, e.g., by suppressing all undesired modes and stabilizing the desired higher-order mode.

PIC technology which assumes integration of several functions within the same optical circuit usually relies on exploiting a multilayer waveguide structure. From a cost point of view it is highly advantageous to produce such a multilayer structure during a single epitaxial growth step, thereby avoiding multiple re-growths, and to form active and passive waveguides on different levels of the structure by standard photolithography and etching techniques. In this case, the mode transformer design should be compatible with general functioning of the multiple vertical waveguide photonic circuit. Namely, the mode transformer should convert higher-order mode generated in the laser waveguide on one structure level into the fundamental mode of the passive waveguide on another vertically separated level. In addition, the optical field in the fundamental mode should be suitable for coupling either into optical fiber or into another passive or active component integrated on the same chip.

Several versions of mode transformers are described in the prior art. For example, Van der Tol ("Optical Switching Device", U.S. Pat. No. 5,574,808) proposed an optical device which incorporates a passive mode converter for transforming one guided mode into another by means of periodic coupling between the first and second guided modes in a bimodal channel-type waveguide. The approach being based on the fact that in a bimodal channel-type waveguide, the field profiles for two modes are characteristically different and, therefore, one of the profiles can be more strongly modified by creating external perturbation to the refractive index profile. The desired index perturbations were proposed to be achieved by means of electro-optical or thermo-optical effects which make the mode-converter quite sophisticated from both fabrication and operational points of view. Another limitation of the invention is that it converts an initial transverse electric (TE) zero-order mode into a transverse magnetic (TM) first-order mode as is disclosed in the patent, conversion of the mode of higher order being taught as problematic. It would be highly desired to develop a mode transformer able to convert modes of arbitrary order and free from any need for electro-optical control.

Another prior approach is that of Kazarinov et al ("Optical Waveguide Multimode to Single Mode Transformer", U.S. Pat. No. 6,580,850) wherein there is taught a waveguide-based mode transformer to facilitate coupling from a wide-area semiconductor laser diode into a single mode optical fiber. The waveguide transformer reliant upon using a separate planar waveguide component which accepts light from the laser chip. Subsequently, the light received by the transformer is supposed to be filtered in a way that higher order modes were "stripped off", leaving only portion of the light corresponding to the laser fundamental mode. Another embodiment of the prior art of Kazarinov transforms a first-order laser mode into a passive waveguide fundamental mode by coupling two lobes of the first-order mode into two separate waveguides and using a planar Mach-Zehnder interferometer to subsequently combine the light fields from two waveguides into one. The fact that two separate chips are assumed to be used for light generation and for mode conversion makes the invention not suitable for advanced PIC devices intended for monolithic integration. Namely, an enormous difficulty related to the light coupling from one chip to another and high insertion loss associated with such coupling rules out application of the prior art by Kazarinov in the monolithic integration architecture.

Recently Vorobeichik et al ("Method and Apparatus for Optical Mode Conversion", U.S. Pat. No. 7,218,814) disclosed a waveguide structure for conversion of one mode of the input waveguide into another mode of the output waveguide. As with the prior art of Van der Tol this mode conversion relies on creating perturbations in the refractive index profile of the waveguide by applying a controlling signal to appropriately positioned electrodes on top of the mode conversion waveguide. However, the electrodes are arranged in the form of the grating whose period must be reciprocal to a phase difference between the first guided mode and the second guided mode. Since the refractive index grating is created through thermo-optic effects, the invention suffers from the drawbacks specific to the devices requiring resistive heating. Namely, sophisticated electrical circuitry and packaging, device calibration and re-calibration when external conditions change, and an overall increase in both device production and operation costs.

Another prior art approach suggested by Leuthold et al ("Multimode Interference Couplers for the Conversion and Combining of Zero- and First-Order Modes", IEEE Journal of Lightwave Technology, Vol. 16, No. 7, pp. 1228-1239, 1998) is based on multimode interference wherein modes of different orders can transform one into another after propagation in a properly designed multimode waveguide. While the suggested approach can be readily used for monolithic integration of the mode converter into a photonic chip, demonstrated performance of conversion efficiency is low and not compatible with the constraints of an optical power budget within the PIC to meet commercial OLT specifications at neither low cost nor optical crosstalk requirements between the multiple elements of the PIC.

Currently PIC architectures are based on multi-layer epitaxial structures where a specific function, such as light generation, multiplexing or detection, is implemented at a particular waveguide layer. From this perspective, mode conversion should be compatible with other functions implemented at any of the particular passive waveguide levels allowing flexibility in multiple emitters and the wavelengths of the emitters. For example, 155 Mb/s BIDI transceivers, wherein modules are required as both 1310 nm emitter/1550 nm detector and 1310 detector/1550 nm emitter. In the prior art developments of multiple waveguide structures are limited, see for example Suematsu et al ("Integrated Twin-Guide AlGaAs Laser with Multiheterostructure", IEEE J. Quantum Electron., Vol. 11, pp. 457-460, 1975) wherein only two vertically-separated waveguides, one active and one passive, are coupled via resonant optical coupling between them. The requirement for increased integration and more advanced functionality has resulted in the establishment of the multiple guide vertical integration platform proposed by Tolstikhin et al ("Integrated Vertical Wavelength (De)Multiplexer" U.S. patent application Ser. No. 11/882,126). Beneficially the incorporation of a mode converter into the multi-guide vertical integration platform would extend functionality of the latter.

Therefore, it would be highly advantageous to provide a solution for the mode transformer that removes the constraints of the prior art and enhances the functionality of existing PIC architectures. It would be further advantageous if the solution was compatible with a single epitaxial growth and standard semiconductor fabrication processes allowing relaxed fabrication tolerances.

SUMMARY OF THE INVENTION

In accordance with the invention, integrated mode converter is designed to be used in the devices in which light generation occurs in one of the higher-order mode. Additionally, it is assumed that light generation is taking place in one of the active waveguides incorporated in a multi-layered semiconductor structure. The invention relies on using cascaded resonance coupling between the waveguides formed both in the vertical and lateral directions with reference to the multi-layered semiconductor structure. The invention discloses transforming a higher-order mode generated in the active waveguide into the fundamental zero-order mode of the passive waveguide for successive coupling into an optical fiber or into other optical component.

In an illustrative embodiment, a monolithically integrated device has a first waveguide which is an active waveguide and where higher-order mode is generated and a second waveguide which is a passive waveguide and which is vertically adjacent to the first waveguide and to which higher order mode from the active waveguide is transferred without changing its symmetry. Laterally adjacent to the second waveguide is a third waveguide which has geometrical characteristics (ridge width) different from those of the second waveguide and to which light from the second waveguide is transferred and where field profile takes the form of the fundamental mode.

A mode transformer embodying in the invention may be employed in conjunction with both the distributed feedback and the Fabry-Perot-type laser diodes. In the latter case the mode transformer being a part of laser cavity fulfills stabilizing function for the particular higher-order mode generated by the laser. Namely, because the mode transformer operates in a manner of a filter which provides minimal transmission loss for the mode of particular order, this particular higher-order mode has preference to be generated as compared to other higher-order modes.

BRIEF DESCRIPTION OF THE DRAWINGS

Exemplary embodiments of the invention will now be described in conjunction with the following drawings, in which:

FIG. 2A illustrates a prior art mode converter in the form of the dual-waveguide mode transformer.

FIG. 2B illustrates a prior art mode converter in the form of a grating based mode transformer.

DETAILED DESCRIPTION OF EMBODIMENTS OF THE INVENTION

Figure 1:
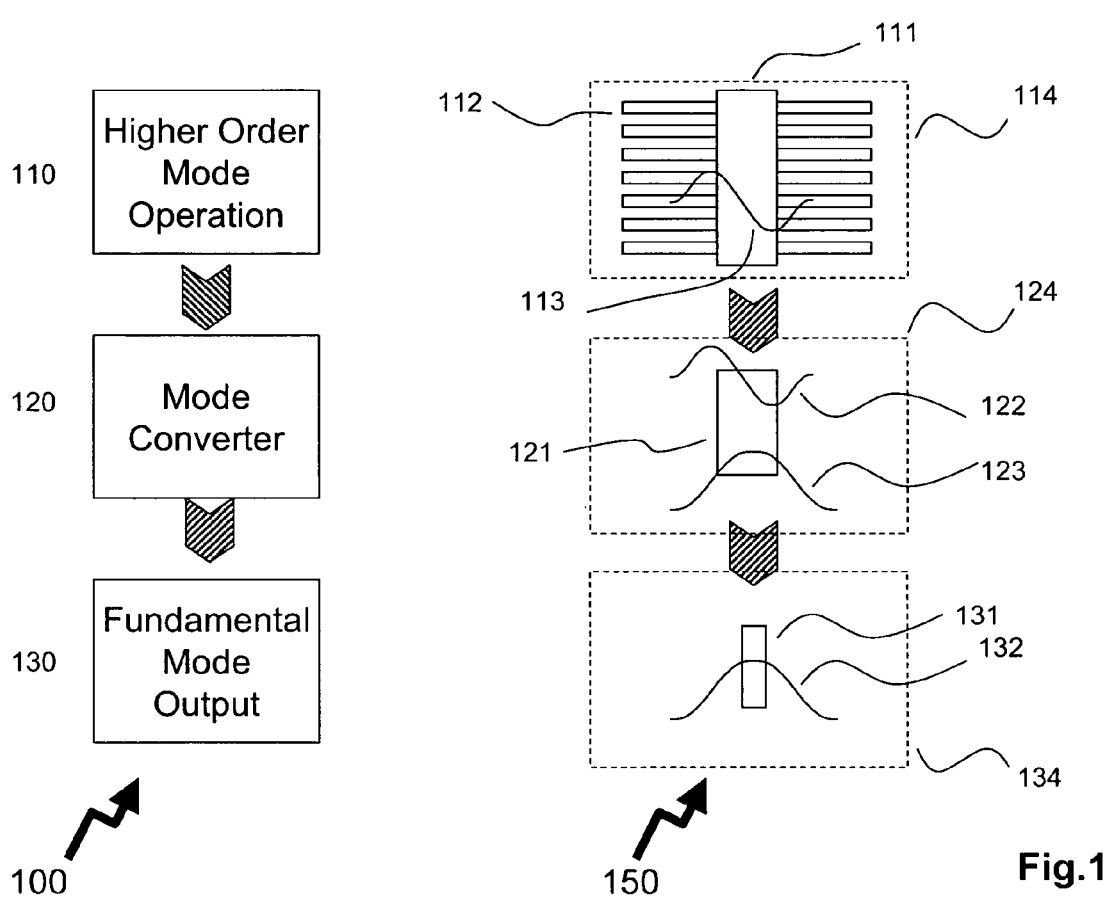
FIG. 1 presents schematic diagram with a mode converter between components operating in different lateral modes.

Referring to FIG. 1 a mode converter is schematically shown as a flow diagram 100 wherein an optical element operates in a higher order mode of operation 110 which should be coupled to a fundamental mode output 130 for satisfactory coupling to subsequent optical elements. Accordingly the flow diagram 100 shows an intermediate operation of a mode converter 120 providing this functional shift in operation of the overall optical assembly. Referring to schematic diagram 150 this flow diagram 100 is depicted schematically as discrete functional elements. Accordingly, the higher order mode of operation 110 is depicted by laser element 114 and consists of laser stripe 111 with grating structure 112 and operating in higher order mode 113.

This higher order mode 113 becomes input field 122 of modal converter 124, representing mode converter 120, which adiabatically couples for lowest insertion loss to a first fundamental mode 123 of the modal converter 124. This first fundamental mode 123 then being coupled to output element 134, representing the fundamental mode output 130 of flow diagram 100. Output element 134 comprising an optical waveguide 131 and providing an output mode field 132.

Laser element 114 offers enhance performance against a fundamental mode laser, not shown for clarity, as the higher lateral mode optical field, represented by in higher order mode 113, interacts with the grating more efficiently as compared to fundamental mode, not shown for clarity. Accordingly grating based optical couplers or other distributed feedback active devices, as well as passive devices, may be better optimized when operating in higher order mode. As such an important element of exploiting these performance enhancements of the higher order mode operation within optical telecommunication systems which are overwhelmingly deployed using single mode optical fiber, and therein supporting only a single fundamental optical mode in their propagation.

In order to explain the novelty of the proposed integrated mode converter, it is instructive to describe prior art approaches. A first prior art mode converter 200 being shown in FIG. 2A. As shown a top view of the mode converter 200 according to invention by Kazarinov et al ("Optical Waveguide Multimode to Single Mode Transformer", U.S. Pat. No. 6,580,050) which is designed to provide output from multimode broad area laser 201 having optical waveguide strip 221 to a single mode fiber 204. The broad area laser is emitting optically in the first-order mode having a mode profile split in two lobes which are coupled into two separate waveguides 222a and 222b of the converter chip 203 through the lens 202. One waveguide, waveguide 222a, is directed to the single mode fiber 204 whilst the other one, waveguide 222b, is terminated by a highly reflective coating 203 such that light propagating in this waveguide is returned back into the laser 201. Besides the issues related to laser destabilization through feedback, the approach of FIG. 2A is not suitable for monolithic integration as it assumes using separate chip for mode converter as well as bulk optics elements, namely lens 202. Planar implementations of optical lens such as Another approach from prior art is illustrated by second mode converter 250 in FIG. 2B where first order mode at the input of the device 206 is converted to the fundamental order mode at the output of the device as described by Vorobeichik et al ("Method and Apparatus for Optical Mode Conversion", U.S. Pat. No. 7,218,814). In this approach, light of first-order mode in the waveguide 206 undergoes action from the heating elements 207A and 207B which perturb refractive index profile of the waveguide 206. Although this solution can be integrated with other functions on the same chip its implementation is quite sophisticated because it relies on specific spatial profile of the perturbation of the refractive index what is hard to control. In addition, complexity related to the heating elements circuitry and their control makes usefulness of the invention by Vorobeichik very restrictive.

The invention of the mode transformer is intended to overcome drawbacks of the prior art and as such provides a solution offering:
  monolithically integration with other active and passive components on the same PIC;
  exploits well established fabrication technologies and manufacturing process tolerances;
  has simple operating principles;
  does not require any active control elements; and
  tolerant to changes of temperature allowing operation in conjunction with uncooled laser sources.

Figure 3:
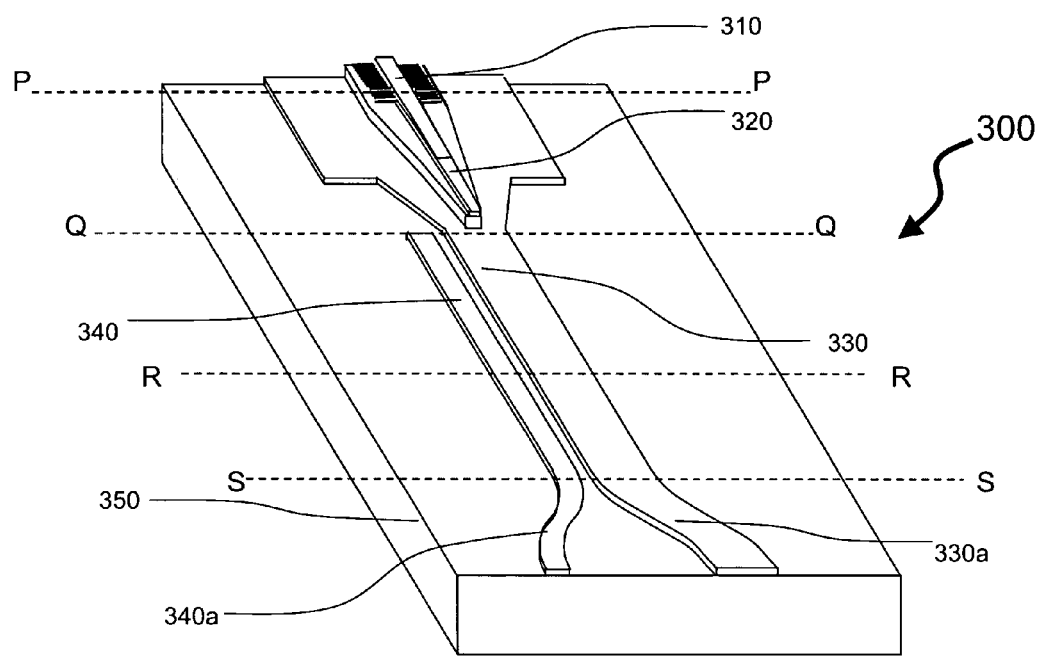
FIG. 3 illustrates a schematic three-dimensional view of an embodiment of the invention in a form of planar resonance coupler integrated with a laterally-coupled distributed feedback laser diode.

Referring to FIG. 3 shown is a schematic three-dimensional view of an embodiment of the present invention in the form of integrated waveguide converter 300 which includes a distributed-feedback (DFB) laser formed monolithically upon substrate 350. Integrated waveguide converter 300 comprises laser waveguide 310 from which light field in the form of higher-order mode couples into the wide passive waveguide 330 through the taper 320. Further, integrated waveguide converter 300 comprises the narrow passive waveguide 340 which is laid out at a predetermined separation from the waveguide 330. This separation is chosen to provide penetration of light from one waveguide to another. It will be understood by those of ordinary skill in the art that light radiation will flow from the first-order mode (or any higher-order mode) of the wide waveguide 330 into the fundamental mode of the narrow waveguide 340 if the propagation constants of two modes match. To achieve matching of the propagation constants the ridge width of the narrow waveguide 340 and the wide waveguide 330 should be selected appropriately.

Once the matching condition is satisfied the higher-order mode of the wide waveguide 330 transforms into fundamental mode of narrow waveguide 340 at some distance along the waveguides, which is called coupling length of directional coupler. The section where waveguides run parallel is chosen in accordance with the coupling length. At the end of the coupler the wide and narrow waveguides 330 and 340 respectively diverge so that light, which is coupled into fundamental mode, can be guided to the proper location on the chip via the curved waveguide 340a. Any residual optical signal within the wide waveguide 330 being controlled within bent waveguide 330a and suitably terminated within the overall PIC of which integrated waveguide converter 300 comprises, the PIC and suitable terminations of bent waveguide 330a are not shown for clarity.

In accordance with present invention the mode converter presented in FIG. 3 is monolithically integrated with a laser diode on a single epitaxial wafer structure grown on the substrate 350. Table 1 below presents an exemplary layer structure in accordance with the embodiment of the invention outlined supra in respect of FIG. 3. The DFB laser being implanted with one of the plurality of possible designs, and is adapted from a design taught by J. Piprek et al ("Cavity Length Effects on Internal Loss and Quantum Efficiency of Multiquantum-Well Lasers", *IEEE J SEL TOP QUANT,* 5, PP. 643-647, 1999).

TABLE 1

Exemplary Layer Structure

| Layer | Material | Bandgap (eV) | Thickness (μm) |
|---|---|---|---|
| 1. Upper Laser Cladding | InP (P-doping $10^{18}$ cm$^{-3}$) | 1.35 | 0.4 |
| 2. Upper SCH | GaInAsP ($\lambda_g$ = 1150 nm) | 1.08 | 0.1 |
| 3. Active MQW | GaInAsP ($\lambda_g$ = 1250 nm) 6 Wells: $Ga_{0.76}In_{0.24}As_{0.79}P_{0.21}$ 5 Barriers: GaInAsP ($\lambda_g$ = 1250 nm) GaInAsP ($\lambda_g$ = 1250 nm) | 0.99 | 0.017 6 × 0.0055 5 × 0.0064 0.017 |
| 4. Lower SCH | GaInAsP ($\lambda_g$ = 1150 nm) | 1.08 | 0.2 |
| 5. Lower Laser Cladding | InP (N-doping 5 × $10^{18}$ cm$^{-3}$) | 1.35 | 0.4 |
| 6. Passive Waveguide | GaInAsP | 1.24 | 0.5 |
| 7. InP Buffer | InP | 1.35 | 0.5 |
| 8. Substrate | InP | 1.35 | N/A |

In the structure of Table 1, the layers 3 "Active MQW" and 6 "Passive Waveguide" are the layers which form the cores of two vertical disposed waveguides, and the layers 5 "Lower Laser Cladding", 6 "Passive Waveguide", and 7 "InP Buffer" are used for implementation of the mode converter, comprising at least the narrow and wide waveguides 340 and 330 respectively. The integrated waveguide converter described supra in respect of FIG. 3 is based upon a manufacturing process flow that implies three etching. In the first etching step, the layer 1 "Upper Laser Cladding" is removed at designed locations to form upper P-contact stripe together with DFB laser surface grating for laser waveguide 310. Within the second etching step, the layers from 2 "Upper SCH", 3 "Active MQW", and 4 "Lower SCH" are processed to form the laser mesa and the taper 320. The wide and narrow ridge waveguides 330 and 340, together with curved and bent waveguides 340a and 330a respectively, are then formed by removing N-doped InP material of the layer 5 "Lower Laser Cladding". This layer 5 "Lower Laser Cladding" also serving also as the laser N-contact layer, being removed in the third etching step. It should be noted that other passive structures, e.g. implementing wavelength division multiplexing functions, can be simultaneously fabricated at the third etching step.

Figure 4A:
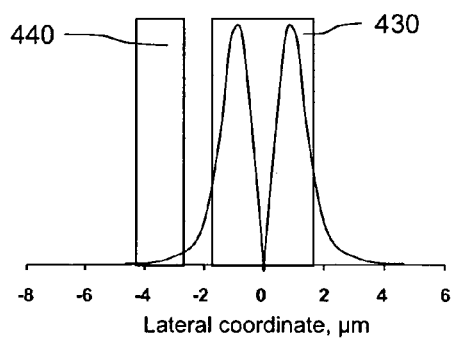
FIGS. 4A through 4C show the optical mode field profile at three different locations along the mode converter of FIG. 3 illustrating energy flow from the first-order mode into fundamental mode.
Figure 4B:
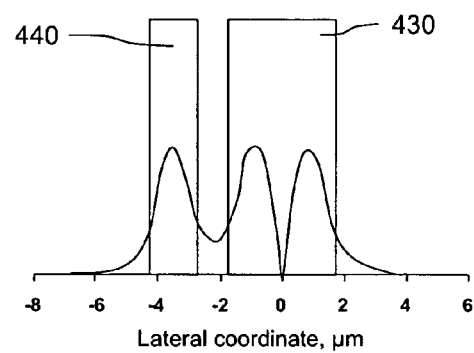
Figure 4C:
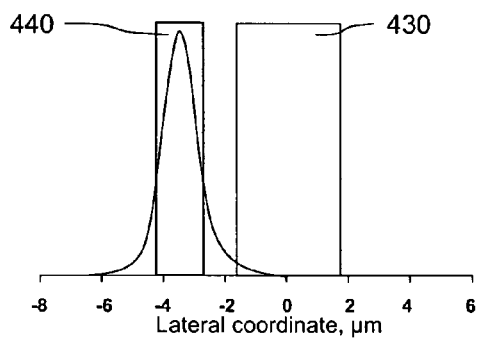

Referring to FIGS. 4A through 4C shown are three field profiles overlapped with the waveguide outlines at different section points within the integrated waveguide converter 300. The field profiles within FIGS. 4A through 4C illustrating power flow from the first-order mode of the wide passive waveguide, equivalent to wide waveguide 330, to the fundamental mode of narrow passive waveguide 440, equivalent to narrow waveguide 330, at three locations Q-Q, R-R and S-S respectively as depicted within FIG. 3. It should be noted that at the location P-P of FIG. 3 the lateral structure of the mode is the same as in the location Q-Q, the difference however being that the mode is residing in the upper vertical laser waveguide.

Accordingly FIG. 4A shows that at the location Q-Q, the light in the form of the first order mode is confined by the wide passive waveguide 430, and only the decaying mode wing penetrates into the adjacent narrow passive waveguide 440. FIG. 4B illustrates the evolving field profile at location R-R of FIG. 3. Here, due to resonance coupling between the modes, fundamental mode in the narrow passive waveguide 440 gets excited. Finally, as it is shown in FIG. 4C all light is transformed into the fundamental mode of the narrow passive waveguide 440 at location S-S where the curved waveguide 340a would start. It would be apparent that the propagation length along the substrate 350 between Q-Q and S-S is approximately the coupling length of the transfer from the wide passive waveguide 430 to the narrow passive waveguide 440.

Figure 5:
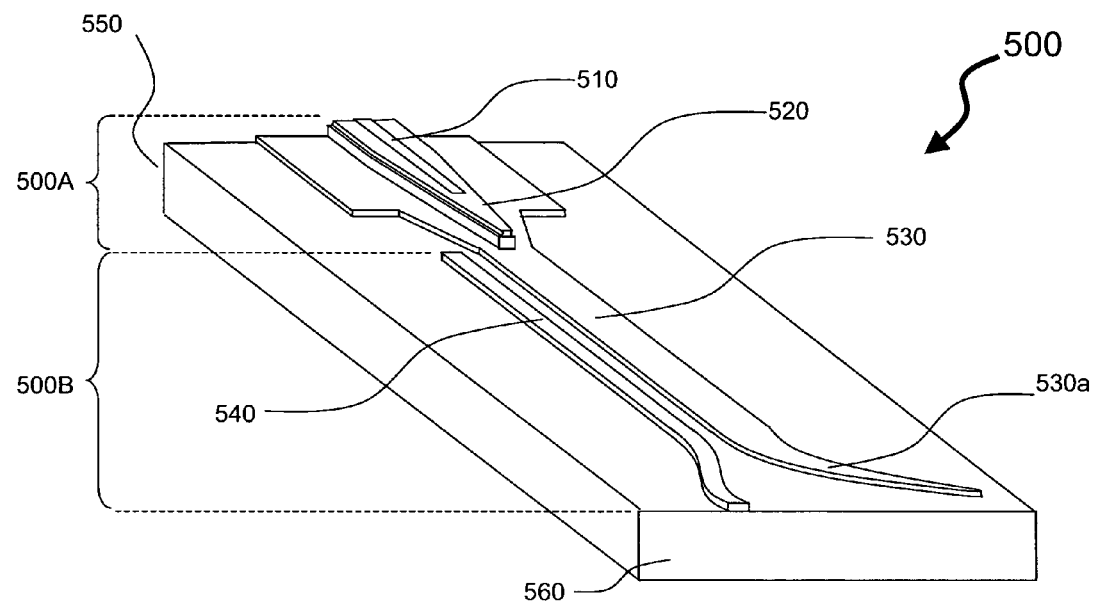
FIG. 5 illustrates a schematic three-dimensional view of an embodiment of the invention in a form of planar resonance coupler integrated with a Fabry-Perot laser diode.

Referring to FIG. 5 there is shown another embodiment of the invention as integrated mode converter 500, wherein the mode converter 500B is integrated with Fabry-Perot laser 500A. In this case, the chip facets 550 and 560 serve as laser cavity mirrors. The wide ridge waveguide of the Fabry-Perot laser 500A is capable of supporting emission in several lateral modes simultaneously, but appropriate design if the mode converter 500B is such that only the single desired higher order mode is resonantly coupled from wide passive waveguide 530 into narrow waveguide 540 and returned back into the laser after reflection from the facet 560. In this situation, mode converter 500B serves also as a filter for undesired higher order mode and a stabilizer for selected mode. The end of the wide passive waveguide 530 being terminated in a way to avoid any feedback for the light staying in the wide passive waveguide 530 through the use of tapered curve 503a. As it is illustrated in FIG. 5 the tapered curve 530a is in the form of a smooth curved waveguide whose width decreases to the limit allowed by the fabrication constraints. Then the light propagating towards the end of the tapered curve 530a is scattered into substrate and does not return back into the laser.

Figure 6:
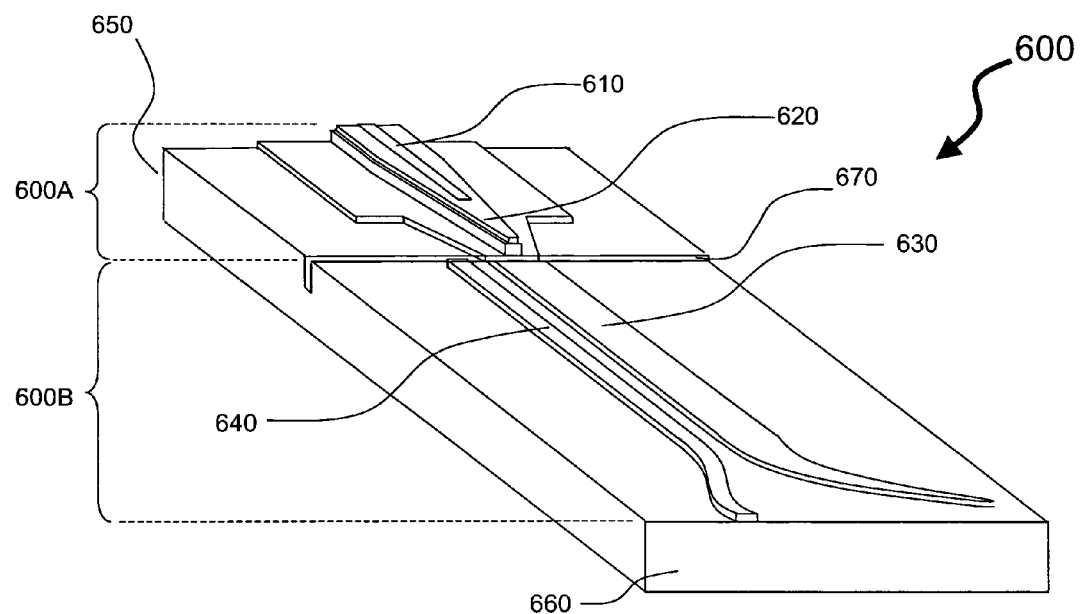
FIG. 6 illustrates a schematic three-dimensional view of an embodiment of the invention in a form of planar resonance coupler integrated with a Fabry-Perot laser diode with the addition of a trench formed between the laser diode and the mode transforming resonant coupler.

Referring to FIG. 6 shown is another embodiment of integrated mode converter 600 of the invention as related to a modification of the embodiment of FIG. 5 wherein the Fabry-Perot laser 600A and the mode converter 600B are separated by a trench 670 which is etched through the core of the passive waveguide layer within which the wide passive waveguide 630 and narrow passive waveguide 640 are formed. In this situation the trench 670 and the rear chip facet 650 form the laser cavity for the Fabry-Perot laser 600A. When any higher order mode generated in the Fabry-Perot laser 600A is transferred from laser waveguide down to the wide passive waveguide 630, it is partially reflected back into the laser at the air interface of the trench 670 whilst the rest of the light penetrates into wide passive waveguide 630 through the trench 670. The width of the trench being chosen from considerations that it should be large enough to provide good fabrication quality, and from other side, the width should be small enough not to allow mode divergence while light propagates through the trench 670 into the wide passive waveguide 630 thereby lowering loss within the integrated mode converter 600.

It would be apparent to one skilled in the art that the positioning of the curved passive waveguide elements, such as tapered curve 530a, and curved and bent waveguides 340a and 330a, is determined in relation to the coupling length of the mode converter, as exemplified by mode converters 500B and 600B. As these curved transitions occur with a gradual increase in waveguide separation and hence reducing coupling constant these elements should be factored into the positioning of the ends of the wide passive waveguide 630 and narrow passive waveguide 640. Alternatively these gradual transitions can be replaced by sharper waveguide transitions, such transitions including turning mirrors and total internal reflection structures.

In the embodiments described supra the mode converter has been presented as part of a two layer PIC with a single active layer and a single passive layer. Alternatively the combination of active laser and passive mode converter may form only a predetermined portion of the overall PIC layer structure. Optionally the active laser and passive mode converter may be present multiple times within a single pair of layers within a larger epitaxial layer structure and even present within multiple pairs of layers within the epitaxial structure. For example, a 1310 nm laser may be implemented within a first active layer and be mode converted within a first passive layer adjacent to the first active layer, a 1550 nm laser implemented a second active layer and be mode converted within a second passive layer adjacent to the second active layer, each of the first and second passive layers being adiabatically coupled at the appropriate wavelengths to a third passive layer.

Numerous other embodiments may be envisaged without departing from the spirit or scope of the invention.

What is claimed is:

1. A method comprising:
   providing a semiconductor substrate for supporting epitaxial semiconductor growth;
   growing an epitaxial semiconductor structure grown on the semiconductor substrate in one growth step comprising first and second epitaxial layers;
   manufacturing a photonic integrated circuit by processing the epitaxial semiconductor structure grown on the semiconductor substrate, the photonic integrated circuit comprising at least an optical emitter within at least the first epitaxial layer, the optical emitter characterized by operating in at least one higher order lateral emitting optical mode, and a mode converter within at least the second epitaxial layer, and being optically coupled to the optical emitter for receiving the at least one higher order lateral emitting optical mode, the mode converter being characterized by producing at its output a fundamental lateral mode.

2. A method according to claim 1 wherein,
the optical emitter is at least one of an optical emitter configured as at least one of a DFB laser, a Fabry-Perot laser, a DBR laser, a predetermined portion of a Fabry-Perot laser, a superluminescent light emitting diode, and an optical amplifier.

3. A method according to claim 1 wherein,
the at least one higher order lateral emitting optical mode is the first higher order lateral emitting mode.

4. A method according to claim 1 wherein,
the at least one higher order lateral emitting mode of is a single higher order lateral emitting mode determined in dependence upon at least the optical emitter and the mode converter.

5. A method according to claim 1 wherein,
providing the mode converter comprises providing at least an asymmetric coupler.

6. A method according to claim 5 wherein,
providing the asymmetric coupler comprises providing a first waveguide within the first epitaxial layer and a second waveguide within the second epitaxial layer.

7. A method according to claim 5 wherein,
providing the asymmetric coupler comprises providing at least two passive waveguides within the second epitaxial layer.

8. A method according to claim 5 wherein,
providing the asymmetric coupler comprises providing a narrow passive waveguide supporting only a zero-order fundamental mode and a wide passive waveguide supporting at least one higher order mode; wherein at least one of the wide passive waveguide and narrow passive waveguide is provided within the second epitaxial layer.

9. A method according to claim 8 wherein,
the optical signal being at least one of the first-order mode and the at least one higher-order mode of the optical emitter is coupled into the wide passive optical waveguide and propagates at least initially as at least one of the first-order mode and the at least one higher-order mode of the wide passive waveguide.

10. A method according to claim 9 wherein,
the optical signal within the wide passive waveguide is resonantly coupled into the narrow passive waveguide resulting in the optical signal propagating as a fundamental zero-order mode.

11. A method according to claim 1 further comprising,
providing at least a trench between the optical emitter and mode converter, the trench forming a predetermined portion of a first partially reflective mirror for operating the optical emitter as a Fabry-Perot laser.

12. An optical component comprising:
a photonic integrated circuit comprising an epitaxial semiconductor structure grown on a semiconductor substrate in one growth step comprising first and second epitaxial layers, the photonic integrated circuit comprising at least an optical emitter within at least the first epitaxial layer, the optical emitter characterized by operating in at least one higher order lateral emitting optical mode, and a mode converter within at least the second epitaxial layer, and being optically coupled to the optical emitter for receiving the at least one higher order lateral emitting optical mode, the mode converter being characterized by producing at its output a fundamental lateral mode.

13. An optical component according to claim 12 wherein,
the optical emitter is at least one of an optical emitter configured as at least one of a DFB laser, a Fabry-Perot laser, a DBR laser, a predetermined portion of a Fabry-Perot laser, a superluminescent light emitting diode, and an optical amplifier.

14. An optical component according to claim 12 wherein,
the higher order lateral emitting optical mode is the first ((a)) higher order lateral mode.

15. An optical component according to claim 12 wherein,
the at least one higher order lateral emitting mode is a single higher order lateral emitting mode determined in dependence upon at least the optical emitter and the mode converter.

16. An optical component according to claim 12 wherein,
providing the mode converter comprises providing at least an asymmetric coupler.

17. An optical component according to claim 16 wherein,
the asymmetric coupler comprises providing a first waveguide within the first epitaxial layer and a second waveguide within the second epitaxial layer.

18. An optical component according to claim 16 wherein,
the asymmetric coupler comprises providing at least two passive waveguides within the second epitaxial layer.

19. An optical component according to claim 16 wherein,
the asymmetric coupler comprises providing a narrow passive waveguide supporting only a zero-order fundamental mode and a wide passive waveguide supporting at least one higher order mode; wherein at least one of the wide passive waveguide and narrow passive waveguide is provided within the second epitaxial layer.

20. An optical component according to claim 19 wherein,
an optical signal of at least one of the zero-order first-order mode and the at least one higher-order lateral emitting optical mode of the optical emitter is coupled into the wide passive optical waveguide and propagates at least initially as at least one of the first-order mode and the higher-order lateral emitting optical mode of the wide passive waveguide.

21. An optical component according to claim 20 wherein,
the optical signal within the wide passive waveguide is resonantly coupled into the narrow passive waveguide resulting in the optical signal propagating as a fundamental zero-order mode.

22. An optical component according to claim 12 further comprising,
at least a trench between the optical emitter and mode converter, the trench forming a predetermined portion of a first partially reflective mirror for operating the optical emitter as a Fabry-Perot laser.

23. A method comprising;
providing a mode converter comprising an epitaxial semiconductor structure grown on a semiconductor substrate in one growth step and comprising at least one epitaxial layer, the mode converter within at least the one epitaxial layer and for receiving at least one input higher order lateral optical mode wherein the at least one input higher order lateral optical mode is a mode other than a fundamental lateral mode and for providing an output optical mode being characterized as a fundamental lateral mode.

24. A method according to claim 23 wherein,
providing the mode converter comprises providing at least an asymmetric coupler.

25. A method according to claim 23 wherein,
providing the mode converter comprises providing a first waveguide supporting at least one optical mode other than a fundamental lateral mode and a second waveguide supporting only a fundamental lateral mode, wherein at least one of the first waveguide and second waveguide are formed within the at least one epitaxial layer of the plurality of epitaxial layers.

* * * * *